United States Patent [19]

Elton

[11] Patent Number: 4,949,508
[45] Date of Patent: Aug. 21, 1990

[54] DOOR ASSEMBLY WITH PULL AND HANDLE CONCEALED BY DOOR TRIM PANEL

[75] Inventor: Robert D. Elton, Ann Arbor, Mich.

[73] Assignee: Hoover Universal, Inc., Ann Arbor, Mich.

[21] Appl. No.: 473,415

[22] Filed: Feb. 1, 1990

[51] Int. Cl.⁵ ............................................. B60J 5/04
[52] U.S. Cl. ........................................ 49/502; 49/460; 49/503; 296/146; 296/39.1
[58] Field of Search ............... 49/460, 502, 503, 501; 296/146, 39.1, 153

[56] References Cited

U.S. PATENT DOCUMENTS

| | | | |
|---|---|---|---|
| 3,015,516 | 1/1962 | Clark | 49/460 X |
| 4,021,072 | 5/1977 | Belanger | 296/146 X |
| 4,226,464 | 10/1980 | Janz et al. | 296/153 |
| 4,686,741 | 8/1987 | Moore et al. | 49/460 X |
| 4,794,735 | 1/1989 | Batchelder et al. | 49/503 |

Primary Examiner—Philip C. Kannan
Attorney, Agent, or Firm—Harness, Dickey & Pierce

[57] ABSTRACT

A door pull for a vehicle door assembly in the form of a rigid strap attached to the door frame and spanning a recess in the door frame. A interior trim panel covers the door pull and an opening in the trim panel adjacent to the door pull provides access for an occupant to reach into the recess behind the door pull to pull the door closed. A door latch release handle can be placed in the recess behind the door pull strap at one end of the recess which is operated by the occupant reaching into the recess and pulling the latch release handle to open the door. No additional trim pieces and attaching hardware are needed to surround the door pull.

12 Claims, 2 Drawing Sheets

DOOR ASSEMBLY WITH PULL AND HANDLE CONCEALED BY DOOR TRIM PANEL

BACKGROUND AND SUMMARY OF THE INVENTION

The present invention relates to a vehicle door assembly and in particular to a door pull and handle concealed by the door trim panel.

Vehicle door assemblies are typically constructed of an inner frame structure that is covered on its outside with a door skin forming the exterior surface of the door. The frame structure is covered on its inner side with a trim panel having some form of upholstery, etc. to provide a finished look to the interior side of the door. The functional components of the door assembly such as the latch, lock mechanism, window regulator, etc. are mounted to the frame structure and covered by the trim panel with the controls, etc. extending through the trim panel for operation from within the vehicle. A door pull is typically provided to enable the occupant, once seated in the vehicle, to grasp the door pull to close the vehicle door.

In one configuration, the door pull is in the form of a loop extending inwardly from the frame structure. The pull is attached to the frame structure over the trim panel, sandwiching the panel between the pull and door frame. One or more additional trim pieces are added to cover the pull and pull attachments to provide a satisfactory appearance. In adding the additional trim pieces, it is desired that no attaching hardware such as screwheads, etc. be visible. As a result, vehicle designers are limited in the styles and configurations that can be used and still maintain a finished appearance. Furthermore, additional parts are required to achieve this finished look.

In other door configurations the door pull is a part of the trim panel. This requires additional support structure in the trim panel to transfer the door pulling loads to the frame structure.

It is the object of the present invention to provide a door pull and trim panel arrangement in which the door pull is mounted to the frame structure and covered by the trim panel in a manner requiring no additional attaching hardware or support structure.

The door assembly of the present invention has a door pull that comprises a metal strap attached to the door frame and spanning over a recess in the frame. The trim panel includes an opening that is positioned immediately above the door pull such that when the trim panel is installed on the door, the door pull itself is covered by the trim panel and not visible. The opening in the trim panel immediately above the door pull enables the user to reach into the recess behind the door pull and to apply a force on the door pull to pull the door closed.

The door latch actuating handle can be mounted adjacent to the door pull in the recess and also covered by the trim panel. The opening in the trim panel enables the operator to reach into the recess behind the handle and rotate the handle to actuate the latch release.

Further objects, features and advantages of the invention will become apparent from a consideration of the following description and the appended claims when taken in connection with the accompanying drawings.

DETAILED DESCRIPTION OF THE INVENTION

Figure 1:
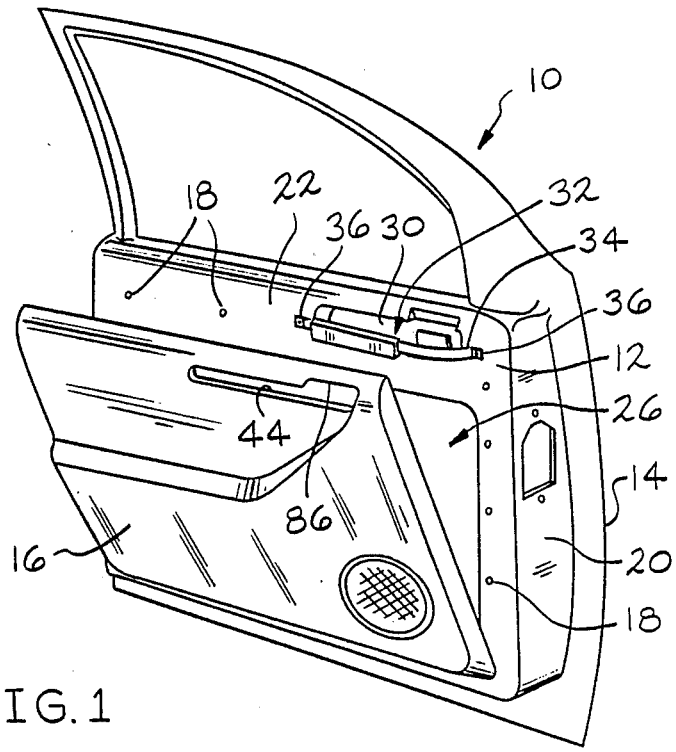
FIG. 1 is a perspective view of the door assembly with the trim panel in a partially installed position.

The door assembly including the trim panel and door pull of this invention is shown in FIG. 1 and designated generally at 10. The door assembly 10 comprises a frame structure 12 to which an exterior door skin 14 is mounted, forming the exterior door surface. A trim panel 16 is attached to the interior side of the frame structure to provide a finished interior appearance to the door structure. The trim panel is attached to the frame structure by a plurality of retaining clips (not shown) extending from the back side of the trim panel which are inserted into the apertures 18 in the frame structure 12.

A portion of frame structure 12 is shown which includes a front vertical portion 20 and upper horizontal portion 22 that form an opening 26 into the hollow interior of the door assembly. The frame structure 12 is shown as a one-piece sheet metal stamping. It can also be constructed of several pieces welded together or alternatively can be formed of a grid structure having a number of vertical supports and horizontal cross members connected together to form a rigid frame structure.

The upper horizontal frame portion 22 is formed with a recess 30 along its inner side over which the door pull 32 is mounted. Door pull 32 is comprised of a metal strap 34, the ends of which are secured to the upper horizontal frame member on opposite sides of recess 30 so the door pull 32 spans over the recess. In the embodiment shown, the ends 36 of the door pull include apertures 38 through which attaching hardware is inserted. The door pull can also be attached by welding or the like.

Figure 3A:
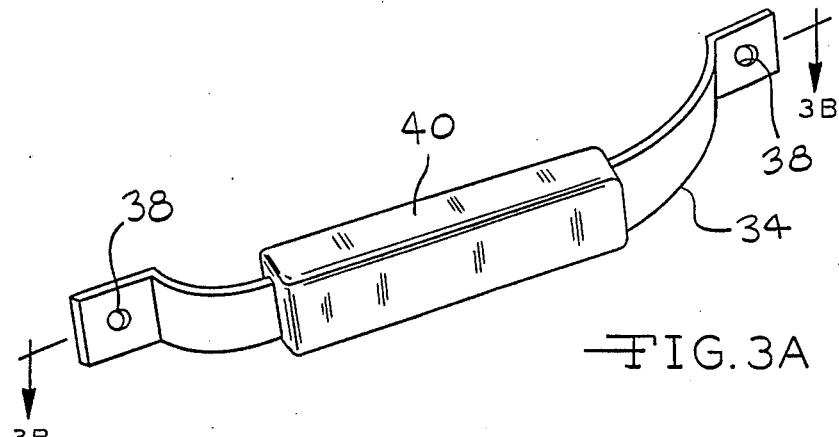
FIG. 3A is a perspective view of the door pull.
Figure 3B:
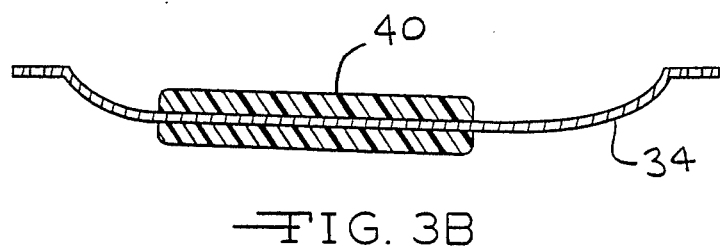
FIG. 3B is a cross-sectional view of the door pull as seen substantially from the line 3B of FIG. 3A.

As shown in FIGS. 3A and 3B, a portion of the strap 34 is encapsulated in a plastic pad 40. Pad 40 provides a smooth finished texture to the portion of strap 34 which is grasped by the user when closing the door.

Figure 4:
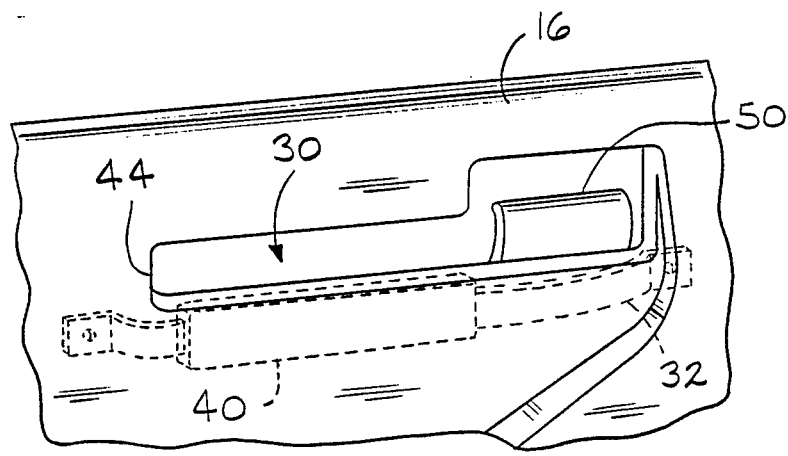
FIG. 4 is a perspective view of the door pull and handle portion of a door assembly with the trim panel installed.

The interior trim panel 16, when attached to the door frame structure 12, covers the door pull 32. An opening 44 in the trim panel is positioned immediately above the door pull to enable the occupant to reach through the trim panel 16 into the recess 30 and behind the door pull to pull the door closed. The trim panel covers the door pull as shown in FIG. 4 so that the occupant cannot see the door pull and is lead to believe that while closing the door, he or she is pulling against the trim panel rather than the door pull attached directly to the door frame structure 12. The door trim covers the door pull without the addition of separate trim members and or additional fasteners for the trim panel adjacent to the door pull. No additional reinforcing or strengthening members are required for the trim panel. In the preferred embodiment, the trim panel opening is above the door pull. Other configurations are possible in which the opening is to one side of or below the door pull.

In the embodiment shown in the figures, the door latch release handle is also accessible through the same opening 44 as is the door pull. In many prior door configurations, the trim panel is installed on the door frame and additional hardware, comprising the latch release handle, is then attached to the interior latch mechanism through an opening in the trim panel leaving the handle exposed in the vehicle for access by the occupants. The door latch handle used in conjunction with the door pull of the present invention is assembled to the frame structure 12 prior to covering of the door with the trim panel. The trim panel covers the handle in much the same way as it covers the door pull. By installing the door handle to the latch mechanism prior to installation of the trim panel, the entire latch mechanism can be functionally tested prior to covering the mechanism with the trim panel. This enables any defects in assembly of the latch mechanism to be corrected before final assembly of the door.

Figure 2:
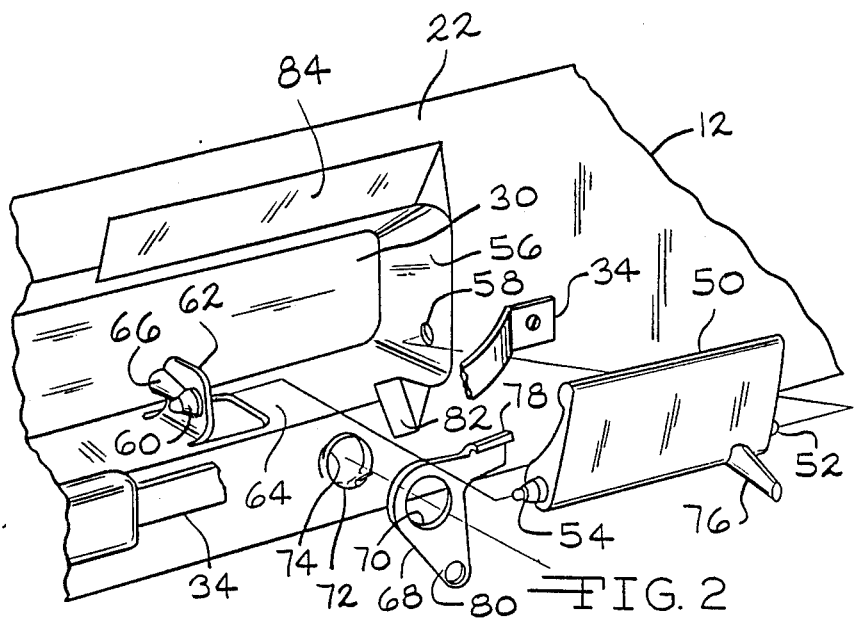
FIG. 2 is an exploded perspective view of the door latch handle.

Latch release handle 50 is installed in one end of the recess 30. As shown in FIG. 2 the handle is installed at the forward end of the recess. Handle 50 includes two mounting studs, forward stud 52 and rear stud 54 axially aligned with one another. The front wall 56 of the recess 30 includes an aperture 58 for reception of the handle mounting stud 52. The rear mounting stud 54 is inserted into a socket 60 formed in flange 62 upturned from the recess bottom wall 64. The upturned flange 62 includes a tunnel 66 which leads from the outward edge of the flange inward to the socket 60. The handle 50 is mounted to the frame structure 12 by positioning the stud 54 outwardly of the tunnel 66, inserting stud 52 into aperture 58 and sliding the rear mounting stud 54 through tunnel 66 until it seats in socket 60. Upturned flange 62 is resilient to provide a snap-fit of the rear mounting stud 54 into the socket 60.

A latch lever 68 is rotatably mounted to the frame structure 12 below the handle 50. Lever 68 includes a relatively large aperture 70 which is snap-fit over the upturned lip 72 formed by punching aperture 74 in the upper horizontal frame portion 22. Handle 50 includes an axially extending arm 76 which, when the handle 50 is rotated inwardly, pushes downward on the lever arm 78 causing rotation of the latch lever 68. In response, lever arm 80 pushes on a push rod (not shown) to actuate the door latch. Alternatively, the door latch could be configured for actuation by a pull rod. Recess 30 includes a lower notch 82 to provide clearance for the arm 76 when the handle is rotated. A biasing spring (not shown) is coupled with the handle 50 to return the handle to its normal position after it is released by the occupant.

In order to provide sufficient access to handle 50, the recess 30 includes a beveled portion 84 above the handle 50 and the opening 44 in the trim panel includes an enlarged portion 86 above the handle 50. Door pull strap 34 also crosses in front of the handle 50. To open the door, the occupant reaches into recess 30 behind the handle 50 and rotates the handle inwardly to release the latch.

The present invention thus achieves the objective of eliminating separate trim pieces which must be attached around the door pull and the fasteners associated therewith. The door assembly provides a simplified assembly process having fewer components and attaching hardware while producing a finished look without screw covers or other trim parts. The latch handle and door pull can be fully assembled and the door interior components tested before the trim panel is attached. In addition, greater styling flexibility is possible as a result of the handle and door pull no longer being visual components of the door interior.

It is to be understood that the invention is not limited to the exact construction or method illustrated and described above, but that various changes and modifications may be made without departing from the spirit and scope of the invention as defined in the following claims.

What is claimed is:

1. A vehicle door assembly comprising:
   an inner door frame structure;
   means forming a door pull to which a vehicle occupant applies a force to move said door assembly from an open position to a closed position, said door pull means transferring the door closing force directly to said frame structure
   an interior door trim panel secured to said frame structure and covering said door pull means, said panel having an opening adjacent to said door pull means through which said occupant can reach to apply said force to said door pull means.

2. The door assembly of claim 1 wherein said frame structure forms a recess behind said door pull means into which said occupant reaches to apply said force to said door pull means.

3. The door assembly of claim 1 wherein said door pull means comprises a rigid member having two ends each connected to said frame structure.

4. The door assembly of claim 3 wherein said frame structure forms a recess behind said rigid member into which said occupant reaches to apply said force to said member.

5. The door assembly of claim 3 further comprising means covering at least a portion of said rigid member surface for providing a finished texture to the portion of said member contacted by said occupant when applying said force to said member.

6. The door assembly of claim 5 wherein said covering means encapsulates a portion of said rigid member.

7. The door assembly of claim 1 wherein said opening in said trim panel is disposed immediately above said door pull means.

8. A vehicle door assembly comprising:
   an inner door frame structure having inner and outer sides and having a recessed portion in the inner side thereof;
   a rigid member having two ends each connected to said frame structure on opposite sides of said recessed portion, said member being of a size relative to said recessed portion and being positioned relative to said recessed portion to enable a vehicle occupant to reach into said recess and behind said member to apply a force to said member to pull said door assembly from an open position to a closed position;
   an interior door trim panel secured to said frame structure and covering said member, said panel having an opening adjacent to said member through which said occupant can reach into said recess to apply said force to said member.

9. The door assembly of claim 8 wherein a portion of said rigid member is encapsulated in a polymeric material.

10. The door assembly of claim 8 wherein said opening is said frame panel is disposed immediately above said rigid member.

11. A vehicle door assembly comprising:

an inner door frame structure;

means forming a door pull to which a vehicle occupant applies a force to pull said door assembly from an open position to a closed position, said door pull means transferring the door closing force directly to said frame structure;

an interior door trim panel secured to said frame structure and covering said door pull means, said panel having an opening adjacent to said door pull means through which said occupant can reach to apply said force to said door pull means; and a handle for actuating a door latch mechanism, said handle being mounted to said frame structure adjacent said door pull means, said handle being covered by said trim panel and said handle being accessible to said occupant through the opening in the door panel for operation of said handle.

12. The door assembly of claim 11 wherein said frame structure has an inner surface and forms a recess in said inner surface;

said door pull means comprising a rigid member having two ends each connected to said frame structure on opposite sides of said recess; and said handle being mounted in said recess adjacent one end of said recess and behind said rigid member.

* * * * *